United States Patent
Yu

(10) Patent No.: US 7,885,609 B2
(45) Date of Patent: Feb. 8, 2011

(54) MULTIMEDIA MOBILE COMMUNICATION TERMINAL SYSTEM AND METHOD

(75) Inventor: Jae-Wook Yu, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 1732 days.

(21) Appl. No.: 10/970,310

(22) Filed: Oct. 20, 2004

(65) Prior Publication Data
US 2005/0083967 A1    Apr. 21, 2005

(30) Foreign Application Priority Data
Oct. 20, 2003   (KR) .................... 10-2003-0073121

(51) Int. Cl.
*H04B 1/38* (2006.01)
(52) U.S. Cl. .................... 455/73; 455/42; 455/63.3; 455/78; 455/83
(58) Field of Classification Search ............ 455/73, 455/42, 63.3, 78, 83, 102, 127.2, 131, 205
See application file for complete search history.

(56) References Cited

U.S. PATENT DOCUMENTS

| 5,506,903 | A * | 4/1996 | Yamashita | 380/216 |
| 7,050,807 | B1 * | 5/2006 | Osborn | 455/445 |
| 2002/0025782 | A1 * | 2/2002 | Tatemori et al. | 455/47 |
| 2002/0090042 | A1 * | 7/2002 | Heinonen et al. | 375/345 |
| 2003/0050055 | A1 * | 3/2003 | Ting et al. | 455/419 |
| 2005/0059427 | A1 * | 3/2005 | Wallace | 455/552.1 |

FOREIGN PATENT DOCUMENTS

| CN | 1142293 A | 2/1997 |
| CN | 1185261 A | 6/1998 |
| CN | 1230076 A | 9/1999 |
| KR | 10 2002 0006759 A | 1/2002 |

* cited by examiner

*Primary Examiner*—Tuan A Pham
(74) *Attorney, Agent, or Firm*—Lee, Hong, Degerman, Kang & Waimey

(57) ABSTRACT

A multimedia mobile communication system and method capable of updating functions of a multimedia mobile communication terminal is provided, wherein the system and method may add to or modify the functions by modifying a software program. The multimedia mobile communication system and method comprises an intermediate frequency processing unit for correcting an error of an intermediate frequency signal through a convolution coding method or a turbo coding method, downloading a software program and allocating, setting, modifying and upgrading specific functions corresponding to the downloaded software program.

5 Claims, 2 Drawing Sheets

MULTIMEDIA MOBILE COMMUNICATION TERMINAL SYSTEM AND METHOD

CROSS-REFERENCE TO RELATED APPLICATIONS

Pursuant to 35 U.S.C. §119(a), this application claims the benefit of earlier filing date and right of priority to Korean Application No. 10-2003-73121, filed on Oct. 20, 2003, the contents of which is hereby incorporated by reference herein in its entirety.

BACKGROUND OF THE INVENTION

1. Field of the Invention

The present invention relates to a mobile communication terminal, and particularly, to a multimedia mobile communication system and method for updating functions of a mobile communication terminal.

2. Description of the Related Art

Generally, a mobile communication system allows a user to communicate with another party through a mobile communication terminal. The communication may be conducted at anytime, any place and while the user is moving. The mobile communication terminal maintains the communication while the user is moving by being wirelessly connected to a mobile base station of a corresponding service area.

An initial system of the mobile communication system, such as a first generation system, uses a voice-grade signal to communicate with another party. A second generation system uses the existing mobile communication system as is, but additionally uses a text and a symbol signal to communicate with another party. A third generation partnership project (3GPP) mobile communication system is a multimedia communication system for communicating voice, text and image signals.

The 3GPP mobile communication system is capable of processing mass image data. Accordingly, the system requires a new concept radio signal transmission method to expedite processing of the image data as well as other data. The 3GPP mobile communication system is divided into a Time Division Synchronous Code Division Multiple Access (TD-SCDMA) system for Mobile Communication developed from a Global System for Mobile Communication (GSM) and a Wideband Code Division Multiple Access (WCDMA) system developed from a Code-Division multiple access (CDMA) system.

As for the 3GPP TD-SCDMA mobile communication system, there are many technical differences between itself and the second generation GSM mobile communication system. First, a 3GPP system construction is different from that of the second generation GSM mobile communication system, as it takes a long time to build a complete 3GPP TD-SCDMA system. For this reason, a transitional technology in between the second and third generation of systems is required. Such a transitional technology is a 2.5th generation TD-SCDMA system (hereinafter referred to as TSM).

TSM is a system for providing a multimedia communication service using a GSM of an existing second generation Time Division Multiple Access (TDMA) system and a General Packet Radio Service (GPRS) mobile communication system network structure. The 2.5th generation TD-SCDMA system has been expected to have the following problems: small data transfer rate, low number of services, relatively low quality of services and a relatively short technology lifespan in comparison with the 3GPP TD-SCDMA system.

In addition, a separate mobile communication terminal is required for the TSM and the 3GPP TD-SCDMA. Accordingly, a financial burden is imposed on both a subscribers side and a service provider's side. It is therefore necessary to develop a new multimedia mobile communication terminal commonly using the TSM and the 3GPP TD-SCDMA.

FIG. 1 is a block diagram showing a multimedia mobile communication terminal according to the related art. A radio frequency (RF) switch 10 selects an RF signal received by an antenna (ANT) based on a control signal from a control unit 60 and applies the selected RF signal to an RF receiving unit 20.

The RF receiving unit 20 detects the RF signal containing a communication signal and applies the detected RF signal to an analog-to-digital converter (ADC) 30. The ADC 30 converts the analog RF signal into a digital RF signal and outputs the converted digital RF signal to a down-converter circuit 40. The down-converter circuit 40 converts the digital RF signal into a digital intermediate frequency (IF) signal and outputs the digital IF signal to a baseband processing unit 50.

The baseband processing unit 50 converts the digital IF signal into a baseband signal, decodes the baseband signal to convert the signal into a multimedia signal and applies the multimedia signal to the control unit 60. The control unit 60 then outputs the multimedia signal to a corresponding path and controls/monitors an operation of the mobile communication terminal.

Thereafter, the multimedia signal outputted from the corresponding path is applied to the baseband processing unit 50 by the control unit 60. The baseband processing unit 50 encodes the multimedia signal to convert the signal into a digital baseband signal and applies the digital baseband signal to the up-converter circuit 70. The up-converter circuit 70 up-converts the digital baseband signal into a digital IF signal and outputs the digital IF signal to a digital-to-analog converter (DAC) 80.

The DAC 80 converts the digital IF signal outputted from the up-converter circuit 70 into an analog IF signal and applies the analog IF signal to an RF transmitting unit 90. The RF transmitting unit 90 up-converts the analog IF signal into an RF signal and applies the RF signal to the RF switch 10. The RF switch 10 then applies the RF signal to the antenna based on a control signal from the control unit 60, wherein the RF signal applied to the antenna is outputted by radio. The RF switch 10 selects the transmission and reception path for the RF signal based on a control signal applied from the control unit 60.

As so far described, in the multimedia mobile communication terminal according to the related art, all signal processing components are implemented in hardware and process only a preset function. Therefore, when specific functions are to be updated or added, the hardware components corresponding to the respective functions need to be restructured. Particularly, the DAC 80, the ADC 30, the up-converter circuit 70 and the down-converter circuit 40 are units which should be newly restructured when a specific function of a mobile communication terminal is updated from TSM to the 3GPP TD-SCDMA system.

Accordingly, because functions of the related art multimedia mobile communication terminal operated in the TSM system cannot be updated or supplemented by the 3GPP TD-SCDMA system, a new mobile communication terminal adopting the 3GPP TD-SCDMA is required.

SUMMARY OF THE INVENTION

The present invention is directed to a multimedia mobile communication system and method capable of updating functions of a multimedia mobile communication terminal, wherein the system and method may add to or modify the functions by modifying a software program.

To achieve these and other advantages and in accordance with the purpose of the present invention, as embodied and broadly described herein, multimedia mobile systems and methods are provided. The system, in one embodiment comprises a radio frequency processing unit for converting a radio frequency signal into an analog intermediate frequency signal, an intermediate frequency processing unit for converting the analog intermediate frequency signal into a digital intermediate frequency signal, a baseband processing unit for converting the digital intermediate frequency signal into a baseband signal and converting the baseband signal into a multimedia signal by decoding the baseband signal and a control unit for outputting the multimedia signal to a corresponding path.

In one exemplary embodiment, the radio frequency processing unit comprises a radio frequency receiving unit for down-converting the radio frequency signal into an analog intermediate frequency signal. In another exemplary embodiment, the intermediate frequency processing unit comprises a broadband high-speed converter for converting an analog intermediate frequency signal received from the radio frequency receiving unit into a digital intermediate frequency signal and a digital modem unit for processing a digital intermediate frequency signal received from the broadband high-speed converter, wherein the broadband high-speed converter preferably converts an analog signal of hundreds of MHz into a digital signal and the digital modem unit comprises a field programmable gate array (FPGA) and a digital signal processor (DSP). The intermediate frequency processing unit downloads a software program and processes the specific functions corresponding to the downloaded software program.

The multimedia mobile communication system further comprises the radio frequency processing unit for converting a received analog intermediate frequency signal into a radio frequency signal, the intermediate frequency processing unit for converting a received digital intermediate frequency signal into an analog intermediate frequency signal, the baseband processing unit for converting a received multimedia signal into a digital baseband signal by encoding the multimedia signal and converting the digital baseband signal into a digital intermediate frequency signal, and the control unit for outputting the multimedia signal received from a corresponding path to the baseband processing unit, wherein the radio frequency processing unit further comprises a radio frequency transmitting unit for up-converting an analog intermediate frequency signal received from the intermediate frequency processing unit into a radio frequency signal and the intermediate frequency processing unit further comprises the digital modem unit for processing the digital intermediate frequency signal received from the baseband processing unit and the broadband high-speed converter for converting the digital intermediate frequency signal received from the digital modem unit into the analog intermediate frequency signal. Preferably, the broadband high-speed converter converts a digital signal into an analog signal of hundreds of MHz and the digital modem unit comprises a field programmable gate array (FPGA) and a digital signal processor (DSP).

In accordance with one aspect of the invention, a multimedia mobile communication method comprises converting a received radio frequency signal into an analog intermediate frequency signal, converting a received analog intermediate frequency signal into a radio frequency signal, converting the analog intermediate frequency signal into a digital intermediate frequency signal, downloading a software program and processing specific functions corresponding to the downloaded software program, converting the digital intermediate frequency signal into a baseband signal, converting the baseband signal into a multimedia signal by decoding the baseband signal and outputting the multimedia signal, and outputting the multimedia signal to a corresponding path.

The converting of a received radio frequency signal comprises filtering the radio frequency signal, down-converting the filtered radio frequency signal into an analog intermediate frequency signal, and outputting the analog intermediate frequency signal to an intermediate frequency processing unit. The converting of a received analog intermediate frequency signal into a radio frequency signal comprises up-converting the analog intermediate frequency signal from the intermediate frequency processing unit into a radio frequency signal and outputting the radio frequency signal to a switching unit.

The intermediate frequency processing unit comprises a broadband high-speed converter for converting an analog intermediate frequency signal received from a radio frequency receiving unit into a digital intermediate frequency signal, outputting the digital intermediate frequency signal and converting a digital intermediate frequency signal received from a digital modem unit into an analog intermediate frequency signal and a digital modem unit for processing a digital intermediate frequency signal received from the broadband high-speed converter and processing a digital intermediate frequency signal received from a baseband processing unit. Preferably, the broadband high-speed converter converts an analog signal of hundreds of MHz into a digital signal and converts a digital signal into an analog signal of hundreds of MHz. Furthermore, the digital modem unit is comprised of a field programmable gate array (FPGA) for allocating, setting, modifying and upgrading specific functions by the software program and a digital signal processor (DSP).

In accordance with yet another aspect of the invention, a multimedia mobile communication system comprises a switching unit for transmitting or receiving a radio frequency signal through an antenna on the basis of a control signal and a radio frequency processing unit for converting the received radio frequency signal into an analog intermediate frequency signal and converting a received analog intermediate frequency signal into a radio frequency signal. The system further comprises an intermediate frequency processing unit for converting the analog intermediate frequency signal into a digital intermediate frequency signal, correcting an error of the digital intermediate frequency signal through a convolution coding method or a turbo coding method, downloading a software program, and allocating, setting, modifying and upgrading specific functions corresponding to the downloaded software program, a baseband processing unit for converting the digital intermediate frequency signal into a baseband signal, converting the baseband signal into a multimedia signal by decoding the baseband signal, and outputting the multimedia signal, and a control unit for outputting the multimedia signal to a corresponding path and outputting a control signal for controlling the switching unit.

In one exemplary embodiment of the invention, the radio frequency processing unit comprises a radio frequency receiving unit for receiving a radio frequency signal containing a communication signal by a switching operation of the switching unit, filtering the received radio frequency signal, down-converting the filtered radio frequency signal into an analog intermediate frequency signal, and outputting the analog intermediate frequency signal to the intermediate frequency processing unit and a radio frequency transmitting unit for up-converting the analog intermediate frequency signal received from the intermediate frequency processing unit into a radio frequency signal and outputting the radio frequency signal to the switching unit.

In another exemplary embodiment of the invention, the intermediate frequency processing unit comprises a broadband high-speed converter for converting the analog intermediate frequency signal received from the radio frequency receiving unit into a digital intermediate frequency signal, outputting the digital intermediate frequency signal, and converting a digital intermediate frequency signal received from a digital modem unit into an analog intermediate frequency signal and a digital modem unit for up-converting a digital baseband signal received from the baseband processing unit into a digital intermediate frequency signal, I/Q modulating and filtering the digital intermediate frequency signal, controlling a gain of the digital intermediate frequency signal, outputting the gain-controlled signal to the broadband high-speed converter, I/Q demodulating a digital intermediate frequency signal received from the broadband high-speed converter, controlling a gain of the digital intermediate frequency signal, channelizing the gain-controlled digital intermediate frequency signal, correcting an error through a convolution coding method or a turbo coding method and processing a transmission/reception composite channel.

Preferably, the broadband high-speed converter converts an analog signal of hundreds of MHz into a digital signal and converts a digital signal into an analog signal of hundreds of MHz. Furthermore, the digital modem unit is comprised of a field programmable gate array (FPGA) for allocating, setting, modifying and upgrading specific functions by the software program and a digital signal processor (DSP).

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Figure 3:
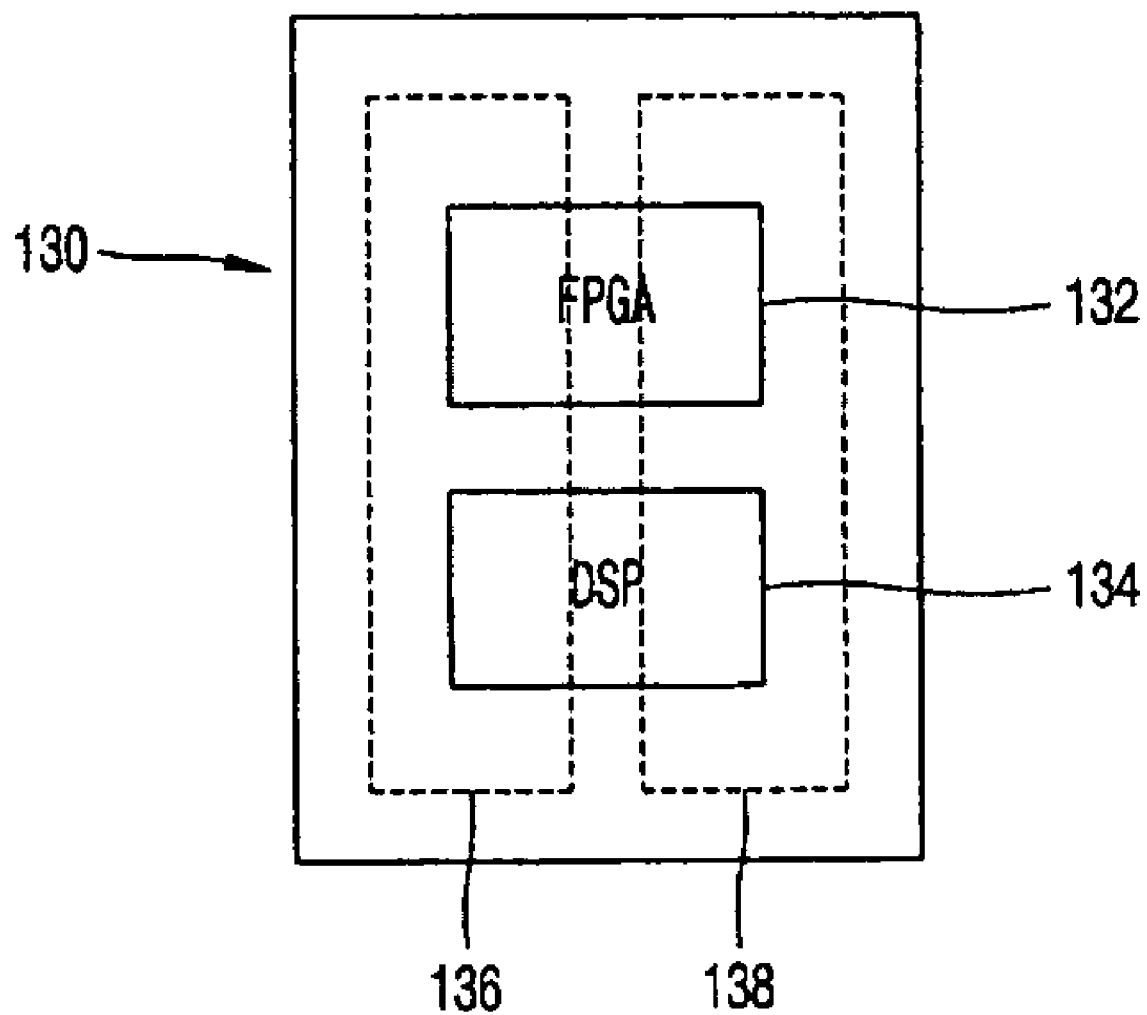
FIG. 3 is a block diagram of a digital modem unit of the multimedia mobile communication system and method of FIG. 2 in accordance with one embodiment of the invention.

One or more embodiments of the present invention relate to a mobile communication terminal and method capable of updating various functions of the TSM and 3GPP TD-SCDMA systems. As shown in FIG. 3, the present invention may add to or modify various functions of the mobile communication terminal by downloading a software program and utilizing a digital modem unit 130 including a field programmable gate array (FPGA) 132 for allocating, setting, modifying or updating specific functions corresponding to the downloaded software program and a digital signal processor (DSP) 134.

As a mobile communication system evolves from a second generation GSM system to a TD-SCDMA standard, determining a proper time to install and operate system equipment corresponding to the two systems becomes difficult. In order to solve such a problem, an intermediate system, such as a TSM mobile communication terminal, is used between the second generation GSM system and the 3GPP TD-SCDMA system, for example.

Because a mobile communication terminal of the 3GPP TD-SCDMA system will be implemented, after the TSM mobile communication terminal is used for a relatively short period of time, the TSM mobile terminal is preferably developed to be reusable or be capable of having its functions upgraded or modified. The present invention is a multimedia mobile communication terminal capable of having specific functions upgraded and modified. Such capability can be valuable when significant differences exist between a TSM mobile communication terminal and a 3GPP TD-SCDMA mobile terminal. For example, in a TSM mobile terminal, an error of a signal is corrected using a convolution coding method; however, in a 3GPP TD-SCDMA mobile terminal, an error of a signal is corrected using a turbo coding method. In addition, a 3GPP TD-SCDMA system processes a transmission/reception composite channel.

Figure 1:
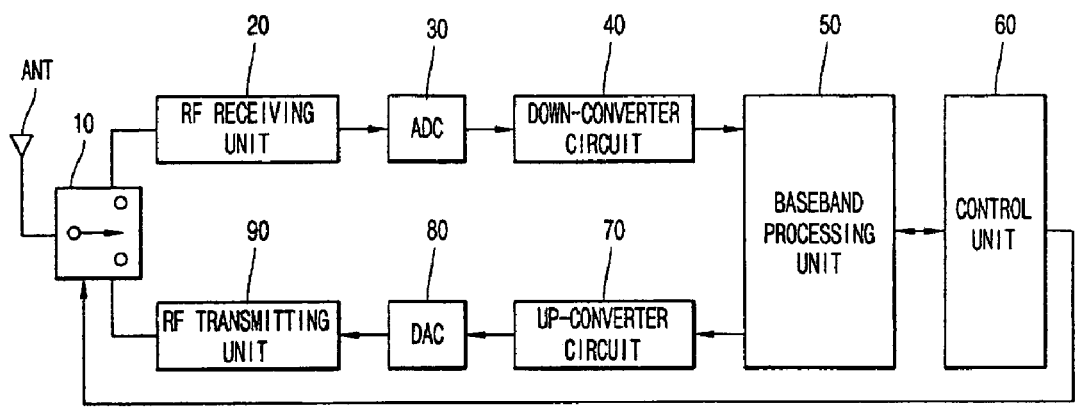
FIG. 1 is a block diagram of a multimedia mobile communication system in accordance with the related art.
Figure 2:
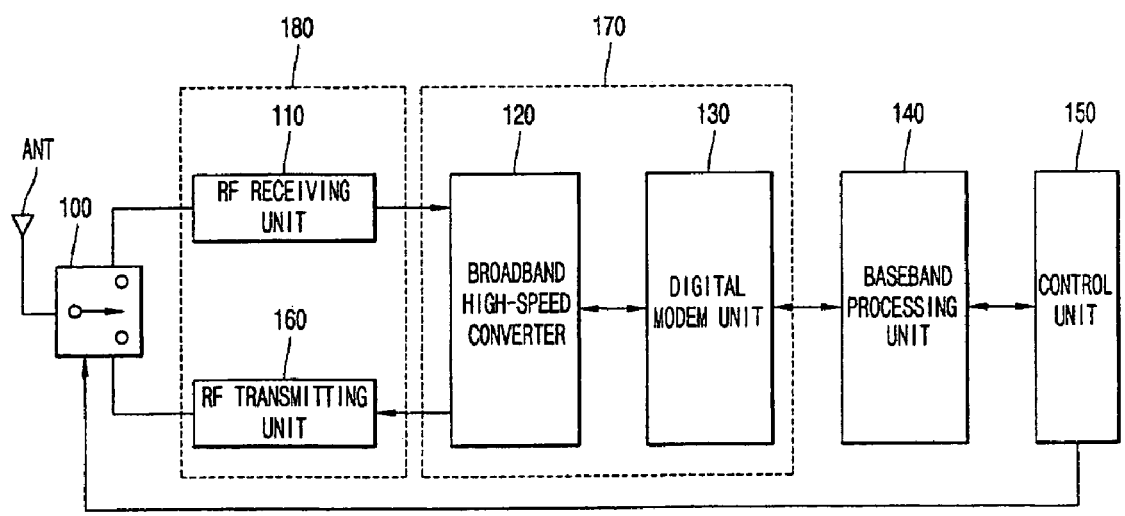
FIG. 2 is a block diagram of a multimedia mobile communication system and method in accordance with one embodiment of the invention.

As shown in FIG. 2, a multimedia mobile communication terminal according to the present invention comprises a switching unit 100 connected to an antenna (ANT), for selecting a signal transmission or reception path based on a control signal. The switching unit 100 is connected to an RF (radio frequency) processing unit 180 for converting an RF signal received through the switching unit 100 into an analog IF (intermediate frequency) signal. The RF processing unit 180 is also capable of converting an inputted analog IF signal into an RF signal. Connected to the RF processing unit 180 is an IF processing unit 170.

The IF processing unit 170 converts the analog IF signal received from the RF processing unit into a digital IF signal. The IF processing unit 170 also converts an inputted digital IF signal into an analog IF signal. The IF processing unit also controls a gain of the digital IF signal, selects a channel of the digital IF signal and codes the digital IF signal. A baseband processing unit 140 connected to the IF processing unit 170 converts the digital IF signal received from the IF processing unit 170 into a digital baseband signal and converts the digital baseband signal into a multimedia signal by decoding the digital baseband signal.

The baseband processing unit is also capable of converting an inputted multimedia signal into a digital baseband signal by encoding the multimedia signal, up-converting the digital baseband signal into a digital IF signal and outputting the digital IF signal to the IF processing unit 170. A control unit 150 connected to the baseband processing unit 140, outputs the multimedia signal received from the baseband processing unit 140 to a corresponding path. The control unit 150 is also capable outputting a multimedia signal outputted from the corresponding path to the baseband processing unit 140. The control unit 150 also outputs the control signal for controlling the switching unit 100.

In accordance with one embodiment, the RF processing unit 180 comprises an RF receiving unit 110 for receiving an RF signal containing a communication signal from a switching operation of the switching unit 100. The RF receiving unit 100 filters the received RF signal, down-converts the filtered RF signal into an analog IF signal and outputs the analog IF signal to the IF processing unit 170. The RF processing unit 180 further comprises an RF transmitting unit 160 for up-converting an analog IF signal outputted from the IF processing unit 170 into an RF signal. The RF transmitting unit also adjusts a level of the RF signal and outputs the level-adjusted RF signal to the switching unit 100.

The IF processing unit 170 comprises a broadband high-speed converter 120 for converting an analog IF signal received from the RF receiving unit 110 into a digital IF signal. The broadband high-speed converter 120 may output the digital IF signal to a digital modem unit 130 and simultaneously convert a digital IF signal received from the digital modem unit 130 into an analog IF signal. Accordingly, the broadband high-speed converter 120 may output the analog IF signal to the RF transmitting unit 160.

Preferably, the digital modem unit 130 I/Q demodulates the digital IF signal received from the broadband high-speed converter 120, controls a gain of the digital IF signal, channels the digital IF signal, corrects an error through a convolution coding method or a turbo coding method and processes a transmission/reception composite channel. The digital modem 130 may also I/Q modulate and filter a digital IF signal received from the baseband processing unit 140, control a gain of the digital IF signal and output the gain-controlled signal. In one exemplary embodiment, the digital modem 130 may also download a software program and allocate, set, modify and upgrade specific functions of the mobile communication terminal corresponding to the downloaded software program. Preferably, the broadband high-speed converter 120 converts an analog signal of hundreds of MHz into a digital signal and converts the digital signal into an analog signal of hundreds of MHz.

Referring to FIG. 3, in an embodiment of the present invention, the digital modem unit 130, comprises a FPGA (Field Programmable Gate Array) 132 for reconfiguring and integrating specific functions of the mobile communication terminal. The digital modem unit 130 further comprises a DSP (Digital Signal Processor) 134 for speedily and accurately processing data. In certain embodiments, the FPGA 132 unrestrictedly operates a number of algorithms at the same time and can integrate the operations. The DSP 134 has a very high operation processing speed, and is thus advantageous when the algorithm is operated at a high speed. Accordingly, the digital modem unit 130 can modify or upgrade specific functions of the mobile communication terminal by modifying only a software program.

Referring to FIGS. 2 and 3, after receiving an RF signal from an antenna, the switching unit 100 removes the RF signal noise, controls a level of the RF signal and outputs the RF signal to the RF signal processing unit 180. The RF processing unit 180 comprises an RF receiving unit 110 and an RF transmitting unit 160. The RF receiving unit 110 removes a noise component of the RF signal received from the antenna through the switching unit 100, properly upwardly adjusts a level of the RF signal, down-converts the RF signal into an analog IF signal, and outputs the analog IF signal to the IF processing unit 170.

The RF transmitting unit 160 removes a noise component of an analog IF signal received from the IF processing unit 170, up-converts the analog IF signal to an RF signal, downwardly adjusts a power level of the RF signal and applies the RF signal to the switching unit 100. At the switching unit 100, the RF signal received from the RF transmitting unit 160 is then transmitted by radio through the switching unit 100 and the antenna.

After receiving the analog IF signal from the RF receiving unit 110, the broadband high-speed converter 120 of the IF processing unit 170 converts the analog IF signal into a digital IF signal. The broadband high-speed converter then outputs the digital IF signal to the digital modem unit 130. In an exemplary embodiment, the broadband high-speed converter 120 simultaneously converts a digital IF signal received from the digital modem unit 130 into an analog IF signal. The broadband high-speed converter 120 then outputs the analog IF signal to the RF transmitting unit 160, for example.

The digital modem unit 130 of the IF processing unit 170 I/Q demodulates a digital IF signal received from the broadband high-speed converter 120. The digital modem unit 130 further controls a gain of the demodulated digital IF signal, selects a channel of the gain-controlled IF signal, corrects an error of the gain-controlled IF signal through a convolution coding method or a turbo coding method, and outputs the error-corrected IF signal. In addition, the digital modem unit 130 of the IF processing unit 170 I/Q modulates and filters a digital IF signal received from the baseband processing unit 140, controls a gain of the modulated digital IF signal and outputs the gain-controlled signal to the broadband high-speed converter 120.

The digital modem unit 130 may be constructed of one or more functional modules according to an algorithm. Each function module provided with the FPGA 132 and the DSP 134 is optimized. For example, the digital modem unit 130 may be classified into an IF function module 136 and a modem function module 138. The IF function module 136 comprises a filtering function module for I/Q modulation/demodulation and removal of a noise component, an AGC function module for automatically controlling a gain and an amplitude, and a channelization function module.

The modem function module 138 programs the FPGA 132 so that an error of a signal inputted/outputted by a mobile communication terminal operated by a TSM is corrected by a convolution code method. Additionally, the modem function module 138 programs the DSP 134 so that an error of a signal inputted/outputted by a mobile communication terminal operated by a 3GPP TD-SCDMA system is corrected by a turbo coding method. The modem function module 138 also performs a transmission/reception composite channel processing function.

The baseband processing unit 140 converts the digital IF signal received from the digital modem unit 130 of the IF processing unit 170 into a digital baseband signal. The baseband unit 140 then converts the digital baseband signal into a multimedia signal by decoding the digital baseband signal and applies the multimedia signal to the control unit 150. Additionally, the baseband processing unit 140 may convert a multimedia signal received from the control unit 150 into a digital baseband signal by coding the multimedia signal. The baseband processing unit may then convert the digital baseband into a digital IF signal and output the digital IF signal to the digital modem unit 130 of the IF processing unit 170.

The control unit 150 sets a transmission path for a multimedia signal received from the baseband processing unit 140 and outputs the multimedia signal to the set transmission path. The control unit 150 may also output a multimedia signal received from the set transmission path to the baseband processing unit 140. Furthermore, the control unit 150 may simultaneously control or monitor the switching unit 100 as well as monitor an operation of the mobile communication terminal.

Accordingly, in the present invention, in developing a mobile communication terminal of a 3GPP TD-SCDMA system from the TSM mobile terminal, a corresponding software program is downloaded so that functions of a digital modem unit 130 can be easily modified. Moreover, a mobile communication terminal according to the present invention can be developed easily so that the mobile communication terminal is quickly released into the market. Accordingly, the market release can be made at a proper time. Further, because the number of components is reduced, fabrication is simplified, thus reducing costs. Hence, in the present invention, by developing one mobile communication terminal applied to the TSM and the 3GPP TD-SCDMA system, a risk of overconsumption, resulting from the purchase of a mobile communication terminal of both the TSM and the 3GPP TD-SCDMA system, can be reduced.

As so far described in detail, the present invention has industrial applicability by upgrading various functions of the TSM and the 3GPP TD-SCDMA system in one multimedia mobile communication terminal. The present invention adds to or modifies the various functions by downloading a software program and utilizing a digital modem unit 130 including a FPGA (Field Programmable Gate Array) 132 for allocating, setting, modifying and upgrading specific functions corresponding to the downloaded software program and a DSP (Digital Signal Processor) 134.

In addition, the present invention is advantageous in that a market price can be lowered by mass-production because new functions can be upgraded, modified and added without a structural modification because of digitalization of the related art mobile communication terminal.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A multimedia mobile communication system station, the multimedia mobile communication system station comprising:

a radio frequency unit for converting a radio frequency signal into an analog intermediate frequency (IF) signal;

an IF processing unit for converting the analog IF signal into a digital IF signal and for performing functions associated with the multimedia mobile communication station;

a baseband processing unit for converting the digital IF signal into a baseband signal and converting the baseband signal into a multimedia signal by decoding the baseband signal; and a control unit for outputting the multimedia signal to a corresponding path, wherein the IF processing unit comprises:

a broadcast high-speed converter for converting the analog IF signal into the digital IF signal, and a digital modem unit for performing various functions with respect to the converted digital IF signal and for configuring a reconfigurable digital IF unit according to a software program downloaded via the digital modem unit, wherein the digital modem unit comprises:

a Field Programmable Gate Array (FPGA) for adding or upgrading the functions associated with the multimedia mobile communication station according to the downloaded software program, and a Digital Signal Processor (DSP) for processing data at a high bandwidth, wherein the digital modem unit comprises an IF function unit and a modem function unit for optimizing function parts provided with the FPGA and the DSP, and wherein the IF function unit processes the converted digital IF signal and the modem function part programs the FPGA using the downloaded software program according to whether the mobile station is operated by a TSM or the 3GPP TD-SCDMA system.

2. The multimedia mobile communication system station of claim 1, wherein the radio frequency unit comprises a radio frequency receiving unit for down-converting the radio frequency signal into the analog IF signal.

3. The multimedia mobile communication system station of claim 1, wherein the analog IF signal is on the order of hundreds of MHz.

4. The multimedia mobile communication system station of claim 1, wherein the intermediate frequency processing unit processes specific functions corresponding to the downloaded software program.

5. The multimedia mobile communication system station of claim 1, wherein the reconfigurable digital IF unit comprises at least a filtering function unit, an AGC function unit, a channelization function unit, a turbo coding function unit or a transmission/reception composite channel processing function unit.

* * * * *